(12) United States Patent
Kremin et al.

(10) Patent No.: US 9,013,195 B2
(45) Date of Patent: Apr. 21, 2015

(54) MUTUAL CAPACITANCE SENSING CIRCUITS, METHODS AND SYSTEMS

(75) Inventors: Victor Kremin, Lviv (UA); Andriy Maharyta, Lviv (UA); Patrick Prendergast, Clinton, WA (US)

(73) Assignee: Cypress Semiconductor Corporation, San Jose, CA (US)

( * ) Notice: Subject to any disclaimer, the term of this patent is extended or adjusted under 35 U.S.C. 154(b) by 677 days.

(21) Appl. No.: 13/191,708

(22) Filed: Jul. 27, 2011

(65) Prior Publication Data

US 2012/0043977 A1 Feb. 23, 2012

Related U.S. Application Data

(60) Provisional application No. 61/376,184, filed on Aug. 23, 2010.

(51) Int. Cl.
| | |
|---|---|
| *G01R 27/26* | (2006.01) |
| *G06F 3/045* | (2006.01) |
| *G06F 3/041* | (2006.01) |
| *G06F 3/044* | (2006.01) |

(52) U.S. Cl.
CPC ............. *G06F 3/0418* (2013.01); *G06F 3/044* (2013.01)

(58) Field of Classification Search
CPC ............................... G06F 3/044; G06F 3/0418
USPC .................... 324/658–690; 345/174
See application file for complete search history.

(56) References Cited

U.S. PATENT DOCUMENTS

| | | | |
|---|---|---|---|
| 7,834,862 B2 | 11/2010 | Liao et al. | |
| 7,952,564 B2 | 5/2011 | Hurst et al. | |
| 7,973,771 B2 | 7/2011 | Geaghan | |
| 7,995,036 B2 | 8/2011 | Perski et al. | |
| 8,031,094 B2 | 10/2011 | Hotelling et al. | |
| 8,054,090 B2 | 11/2011 | Philipp et al. | |
| 2007/0075923 A1 | 4/2007 | Beuker et al. | |
| 2008/0007534 A1 | 1/2008 | Peng et al. | |
| 2008/0079699 A1 | 4/2008 | Mackey | |
| 2008/0246723 A1 | 10/2008 | Baumbach | |
| 2009/0009483 A1 | 1/2009 | Hotelling et al. | |
| 2009/0153152 A1* | 6/2009 | Maharyta et al. | 324/684 |
| 2010/0026660 A1 | 2/2010 | Kitamura | |
| 2010/0033196 A1 | 2/2010 | Hayakawa et al. | |
| 2010/0033443 A1 | 2/2010 | Hashimoto | |
| 2010/0060591 A1 | 3/2010 | Yousefpor et al. | |

(Continued)

FOREIGN PATENT DOCUMENTS

| | | |
|---|---|---|
| KR | 20060132145 A | 12/2006 |
| KR | 20080096977 A | 11/2008 |

OTHER PUBLICATIONS

Fang, W. (Jul. 2007). "Reducing Analog Input Noise in Touch Screen Systems" Texas Instruments Application Report, 12 pages.

(Continued)

*Primary Examiner* — Melissa Koval
*Assistant Examiner* — Farhana Hoque

(57) ABSTRACT

A capacitance sensing system may include a first selection circuit that couples N electrodes of a first electrode set to a capacitance sense circuit; and a second selection circuit that couples M electrodes of a second electrode set, substantially simultaneously, to a signal generator circuit as a group to induce current in the N electrodes by mutual capacitance between the M and N electrodes; wherein N is at least one, and M>N.

12 Claims, 11 Drawing Sheets

(56) References Cited

U.S. PATENT DOCUMENTS

| | | |
|---|---|---|
| 2010/0073325 A1 | 3/2010 | Yang |
| 2010/0073341 A1 | 3/2010 | Toyooka et al. |
| 2010/0139991 A1 | 6/2010 | Philipp et al. |
| 2010/0141605 A1 | 6/2010 | Kang et al. |
| 2010/0149127 A1 | 6/2010 | Fisher et al. |
| 2010/0244859 A1 | 9/2010 | Cormier, Jr. et al. |
| 2010/0295564 A1 | 11/2010 | Reynolds |
| 2011/0018557 A1* | 1/2011 | Badaye .................. 324/658 |
| 2011/0055305 A1 | 3/2011 | Matsushima |
| 2011/0063154 A1 | 3/2011 | Hotelling et al. |
| 2011/0109568 A1 | 5/2011 | Wu et al. |
| 2011/0163992 A1 | 7/2011 | Cordeiro et al. |
| 2011/0254802 A1 | 10/2011 | Philipp |
| 2012/0013565 A1 | 1/2012 | Westhues et al. |

OTHER PUBLICATIONS

Silicon Labs. "How to minimize touchscreen Electromagnetic Interference." 7 pages.

* cited by examiner

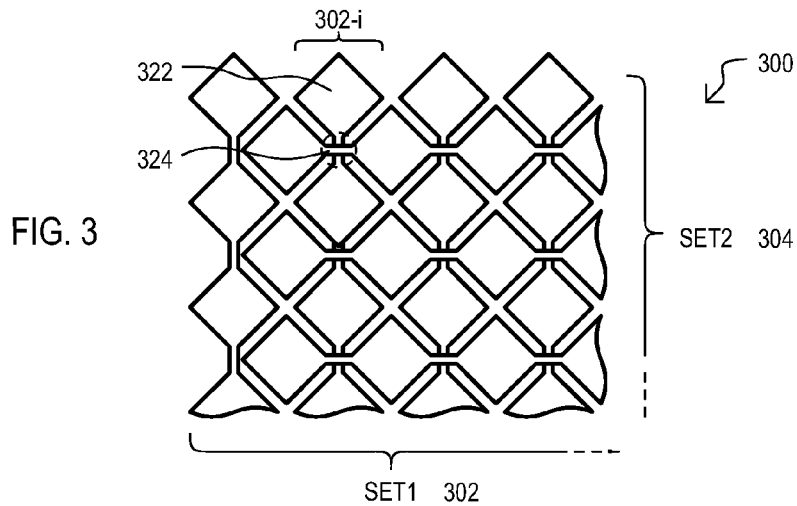
FIG. 3
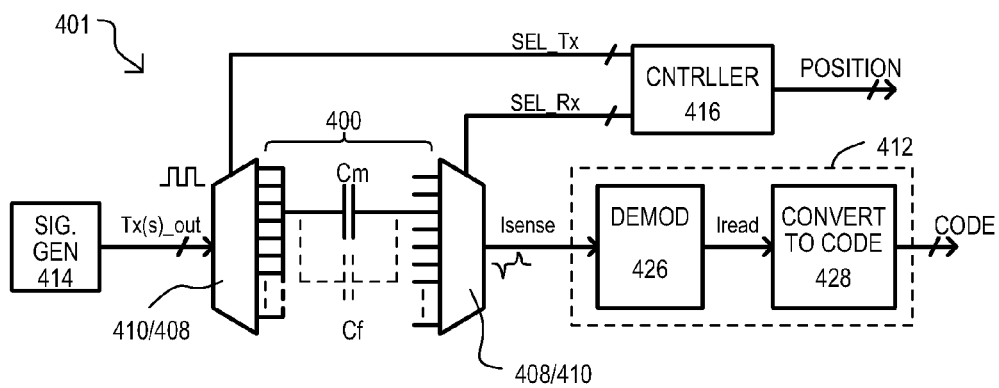
FIG. 4
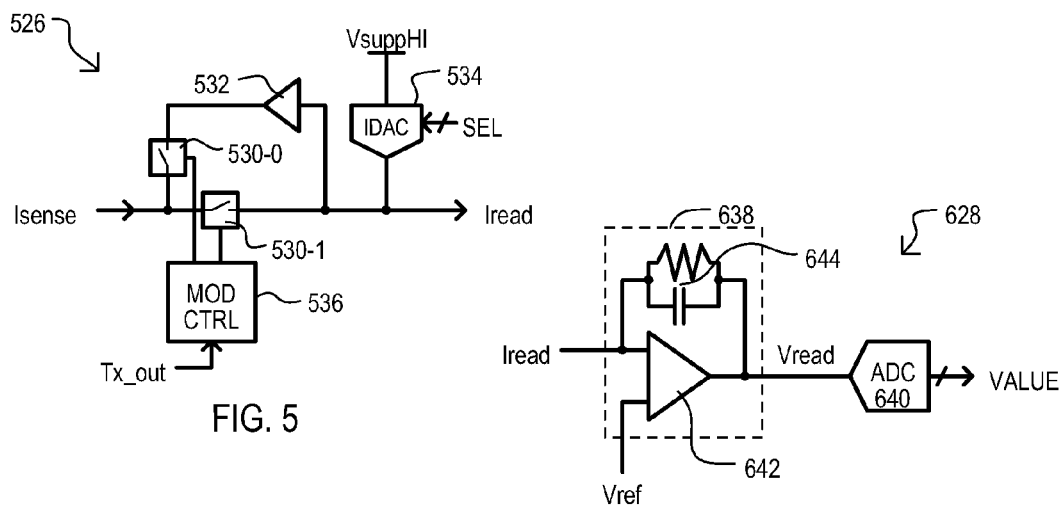
FIG. 5
FIG. 6

MUTUAL CAPACITANCE SENSING CIRCUITS, METHODS AND SYSTEMS

This application claims the benefit of U.S. Provisional Patent Application Ser. No. 61/376,184, filed on Aug. 23, 2010, the contents of all of which are incorporated by reference herein.

TECHNICAL FIELD

The present disclosure relates generally to sensing devices, and more particularly to devices that determine the proximity of an object based on capacitance sensing.

BACKGROUND

Computing devices may include human interface devices (HIDs) that enable a person to create input data for, and in some cases sense output data from, a computing device. Computing devices may include, but are not limited to, personal computers (including both desktop and notebook computers), tablet computing devices, mobile handsets, personal data assistants (PDAs), kiosks, point of sale devices, or other personal entertainment devices (i.e., portable gaming devices, portable music and/or video players, etc.).

Some HIDs include a sensor surface. A sensor surface may detect the contact of an object on a surface, or the proximity of an object to the surface. Some of the many variations of a sensor surface include, but are not limited to: a touch sensor pad (i.e., touchpad) often used to emulate the function of a personal computer (PC) mouse, or a touchscreen often used as an interface for mobile sets, tablet computers and some personal computers. Sensor surfaces may provide one-dimensional sensing, detecting an object movement in one dimension (e.g., slider, single touch button, etc.), two-dimensional sensing, detecting movement along two axes, and may even include three dimensional sensing (sensing an object position in space proximate to the sensor surface).

Some sensor surfaces may operate by way of capacitance sensing utilizing sensor electrodes. A capacitance, as detected by sensor electrodes, may change as a function of the proximity of an object to the sensor electrodes. The object can be, for example, a stylus or a user's finger. In some devices, a change in capacitance may be detected by each sensor in the X and Y dimensions of a sensor array. According to detected changes in capacitance at such sensors, a position of an object (or objects) may be determined.

FIG. 14 shows one example of conventional "self" capacitance sensing. FIG. 14 shows a set of sensor electrodes 1400. A self-capacitance (Cp) of one selected electrode 1402 may be sensed by connecting such a sensor to sense connection (shown as RX). A self-capacitance (Cp) may be a capacitance of the selected electrode 1402 with respect to ground. If a sensed self-capacitance is outside of a threshold limit, an object may be considered present at the position of the selected electrode 1402. Conversely, if a sensed self-capacitance is within a threshold limit, an object may not be considered present at the position of the selected electrode 1402.

FIG. 15 shows one example of conventional mutual capacitance sensing. FIG. 15 shows a two set of sensor electrodes 1500. A mutual capacitance (Cm) may exist between two electrodes: a receive (Rx) electrode 1502-0 and a transmit (Tx) electrode 1502-1. It is understood that one set of electrodes (e.g., 1502-0 or 1502-1) may be disposed perpendicular to the other set of electrodes (e.g., 1502-1 or 1502-0). A periodic signal may be transmitted on the Tx electrode 1502-1. Due to mutual capacitance (Cm), the electrical signal at the Tx electrode 1502-1 may induce a current on the Rx electrode 1502-0. Similar to the conventional self-capacitance sensing of FIG. 14, if a sensed mutual capacitance is outside of a threshold limit, an object may be considered present at the position of the selected electrodes 1502-0/1. Conversely, if a sensed mutual capacitance is within a threshold limit, an object may not be considered present at the position of the selected electrodes 1502-0/1.

BRIEF DESCRIPTION OF THE DRAWINGS

FIG. 3 is a top plan view of an electrode array that may be included in embodiments.

FIG. 4 is a block schematic diagram showing a sensing configuration according to an embodiment.

FIG. 5 is a block schematic diagram of a demodulator circuit that may be included in embodiments.

FIG. 6 is a block schematic diagram of a convert-to-code circuit that may be included in embodiments.

DETAILED DESCRIPTION

Various embodiments will now be described that show capacitance sensing systems, devices and methods that may drive an entire set of electrodes with one or more electrical signals to induce a capacitance on one or more electrode of another set, due to mutual capacitance between such electrodes.

Particular embodiments may sense an object position on a two-dimensional capacitance sensor array, in two sense operations. In a first sense operation, sensors of one side of the sensor array may be driven with one or more inducing signals (e.g., all X-direction sensors serve collectively as one Tx electrode), while a mutual capacitance is sensed for each sensor of the other side (e.g., a mutual capacitance is sensed for each Y-direction sensor individually). In a second sense operation, such actions are reversed. Sensors of the other side of the sensor array may be driven with one or more inducing signals (e.g., all Y-direction sensors serve collectively as one Tx electrode), while a mutual capacitance is sensed for each sensor of the first side (e.g., a mutual capacitance is sensed for each X-direction sensor individually).

Figure 1A:
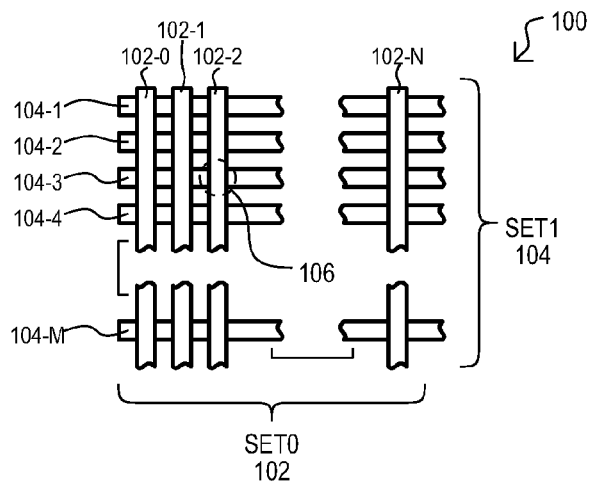
FIGS. 1A to 1C are figures showing a sensing operation according to one embodiment.
Figure 1B:
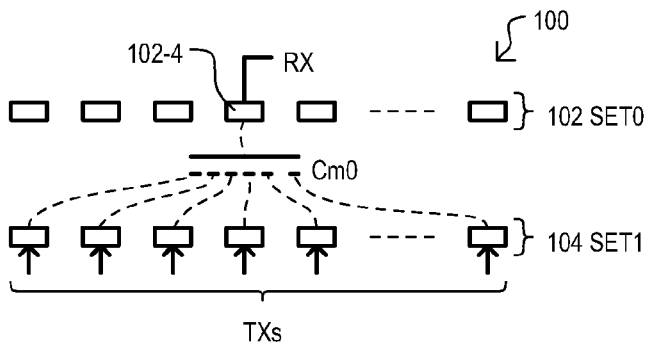
Figure 1C:
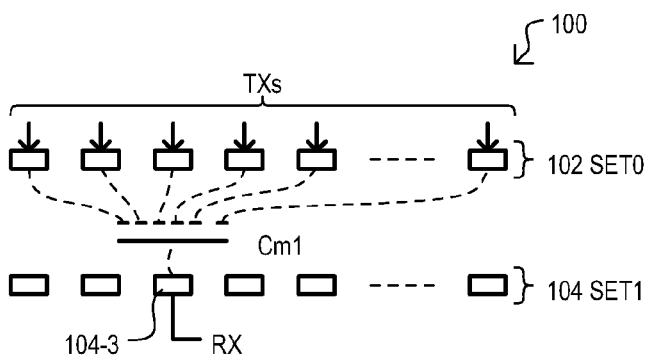

Referring now to FIGS. 1A to 1C, a sensing operation according to a first embodiment is shown in a series of diagrams.

Referring to FIG. 1A, an electrode array that may be included in embodiments is shown in a plan view and designated by the general reference character 100. An electrode array 100 may include a first set of electrodes 102 and a second set of electrodes 104. In the following description it will be assumed that an object touches, or is in proximity to, electrode array 100 at object location 106. In the embodiment shown, first electrode set 102 may include N electrodes 102-1 to -N, and second electrode set 104 may include M electrodes 104-1 to -M. Electrodes (102-1 to -N) of first electrode set 102 may be disposed substantially orthogonal to electrodes (104-1 to -M) of second electrode set 104.

Referring to FIG. 1B, a first part of a sensing operation is shown in a diagram that depicts electrode sets (102, 104). A mutual capacitance (Cm0) may be measured between each individual electrode of first electrode set 102, and all the electrodes of second electrode set 104. In FIG. 1B, electrodes (104-1 to -M) of second set 104 may be driven with one or more transmit electrical signals. As a result, electrodes (104-1 to -M) may function as common transmit electrodes (TXs). In contrast, one electrode 102-4 of first electrode set 102 may be connected to a capacitance sensing circuit as a receive electrode (RX). Such a sensing operation may repeat with each individual electrode of first electrode set 102. Thus, a mutual capacitance may be measured between each electrode of first electrode set 102 and all electrode of second electrode set 104.

Referring back to FIG. 1A, a first part of a sensing operation, like that described in FIG. 1B, may detect a change in capacitance for electrode 102-2 (corresponding to object location 106). More particular, the presence of an object at object position 106 may cause a reduction in the mutual capacitance of electrode 102-2 with respect to electrode set 104, as compared to capacitance absent such an object.

Referring to FIG. 1C, a second part of a sensing operation is shown. A mutual capacitance (Cm1) may be now be measured between each individual electrode of second electrode set 104 and all the electrodes of first electrode set 102. In FIG. 1C, electrodes (102-1 to -N) of first set 102 may be driven with one or more transmit electrical signals. As a result, electrodes (102-1 to -N) may function as common transmit electrodes (TXs). In contrast, one electrode 104-3 of second electrode set 104 may be connected to a capacitance sensing circuit as a receive electrode (RX). Such a sensing operation may repeat with each individual electrode of second electrode set 104. Thus, a mutual capacitance may be measured between each electrode of second electrode set 104 and all electrode of second electrode set 102.

Referring back to FIG. 1A, a second part of a sensing operation, like that described with reference to FIG. 1C, may detect a change in capacitance for electrode 104-3 (corresponding to object location 106). More particular, the presence of an object at object position 106 may cause a reduction in the mutual capacitance of electrode 104-3 with respect to first electrode set 102.

In this way, a mutual capacitance between electrodes of one electrode set and multiple electrodes of a second electrode set may be utilized to sense a position of an object.

Figure 2A:
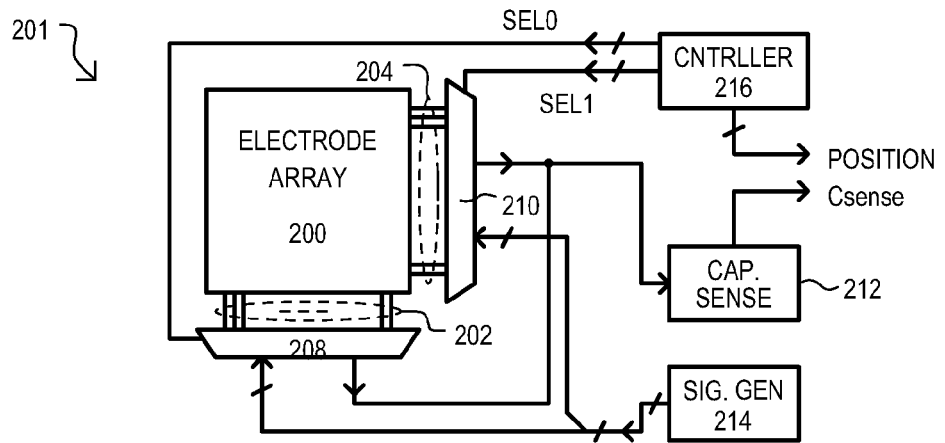
FIGS. 2A to 2C are diagrams showing a system according to an embodiment, including selection circuits that may be included in embodiments.

Referring to FIG. 2A, a system according to one embodiment is shown in a block schematic diagram and designated by the general reference character 201. A system 201 may include an electrode array 200, a first selection circuit 208, a second selection circuit 210, a capacitance sense circuit 212, a signal generator circuit 214, and a controller 216. An electrode array 200 may include a number of sense electrodes selectable by first and/or second selection circuits (208 and/or 210). In the embodiment shown, electrode array 200 may include first and second electrode sets (202 and 204).

First selection circuit 208 may be connected between first electrode set 202 and both capacitance sense circuit 212 and signal generator circuit 214. In response to control signals from controller 216, first selection circuit 208 may connect different electrodes from first electrode set 202, individually or in groups, to either capacitance sense circuit 212 or signal generator circuit 214.

In a similar fashion to first selection circuit 208, second selection circuit 210 may be connected between second electrode set 204 and both capacitance sense circuit 212 and signal generator circuit 214. In response to control signals from controller 216, second selection circuit 210 may connect different electrodes from second electrode set 204, individually or in groups, to either capacitance sense circuit 212 or signal generator circuit 214.

First and second selection circuits (208 and 210) may be conceptualized as one configurable selection circuit controlled by controller 216.

Capacitance sense circuit 212 may sense a capacitance of one or more electrodes of electrode array 200 as such electrode(s) are connected via first or second selection circuits (208 or 210). A capacitance sense circuit 212 may sense a capacitance of a selected electrode(s) according to any suitable technique. Embodiments of particular capacitance sensing approaches are shown in more detail below. A measured capacitance value (Csense) may be output from capacitance sense circuit 212.

A signal generator 214 may generate one or more transmit signals for application to multiple electrodes within electrode array 200 via first or second selection circuits (208 or 210). In particular embodiments, transmit signals may be periodic signals that induce a current in a sensed electrode.

Controller 216 may generate control signals (SEL0, SEL1) for enabling connections through selection circuits (208, 210). According to such signals, controller 216 may enable connections between electrodes and capacitance sense circuit 212 and signal generator circuit 214. Controller 216 may output position data (POSITION) corresponding to an electrode connected to capacitance sense circuit 212. Position data (POSITION) in combination with a measured capacitance value (Csense) can be utilized to establish a position of an object on, or in proximity to, electrode array 200.

Figure 2B:
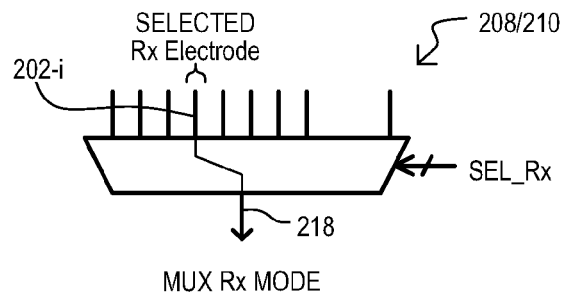
Figure 2C:
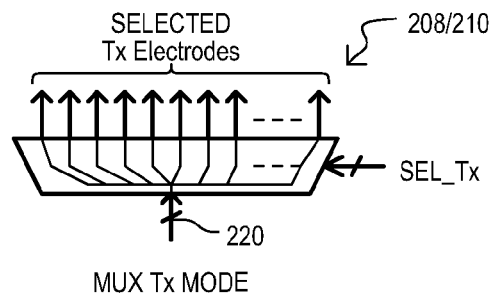

Referring now to FIGS. 2B and 2C, modes of operation for first and second selection circuits (208, 210), according to embodiments, will now be described. FIG. 2B shows a selection circuit (208/210) in a receive (Rx) mode. In an Rx mode, a selection circuit (208/210) may connect one electrode (a selected electrode 202-$i$) to a capacitance sense input 218 based on selection control data SEL_Rx. Such an action may be repeated for each electrode connected to the selection circuit (208/210) to acquire capacitance sense readings for each such electrode.

FIG. 2C shows a selection circuit (208/210) in a transmit (Tx) mode. In a Tx mode, a selection circuit (208/210) may connect multiple electrodes (in this embodiment all electrodes connected to the selection circuit) to a signal generator output 220 based on selection control data SEL_Tx. In some embodiments more than one Tx signal may be provided at signal generator output 220.

In some embodiments, in a same sensing operation, Tx signals may be driven at different phases with respect to one another. In very particular embodiments, groups of Tx signals may be periodic signals having opposite phases. In one portion of a sensing operation, one group of Tx electrodes may be driven in one phase, while in another portion of a sensing operation, other Tx electrodes may be driven in another phase.

FIGS. 2D-0 to 2E-2 show a sensing operation according to one embodiment. The figures show a portion of an electrode array 200' including eight electrodes (102-0 to -7) serving as Tx electrodes, and one electrode (104-i) serving as an Rx electrode. Each figure also includes a graph showing one example of a current response to sense conditions.

Figures 0, 2D:
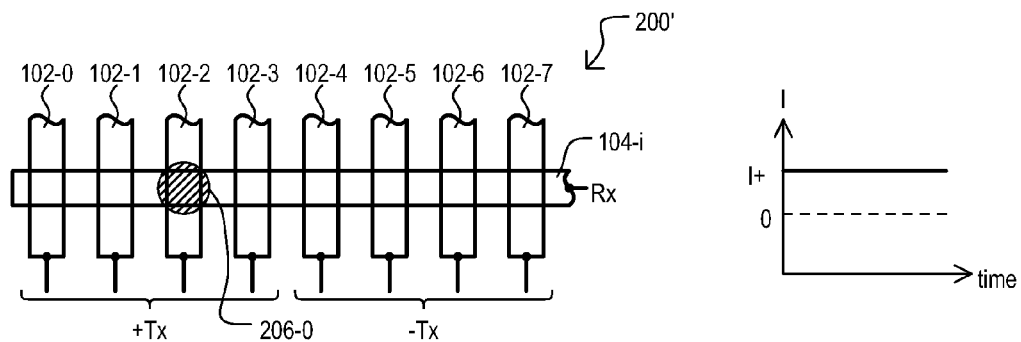
FIGS. 2D-0 to 2E-2 are diagrams showing sense operations according to alternate embodiments.
Figures 1, 2D:
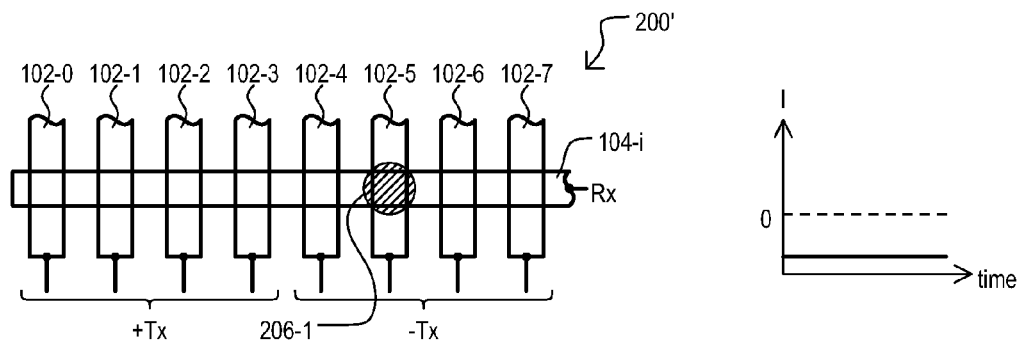
Figures 2, 2D:
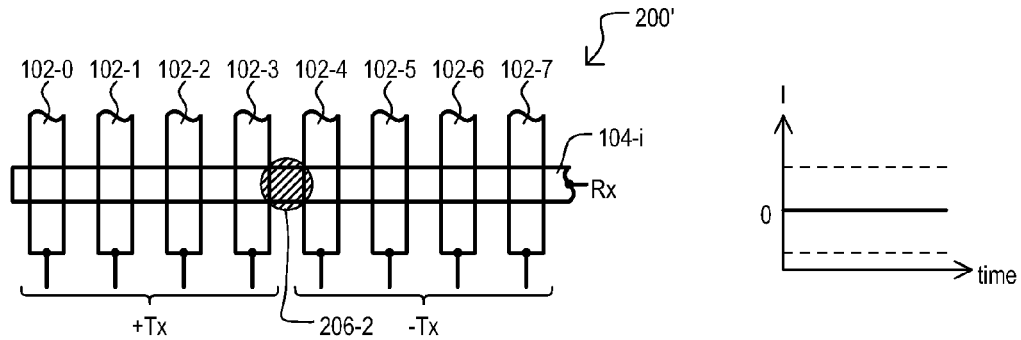

FIGS. 2D-0 to 2D-2 show a first measurement period in which one group of electrodes (102-0 to -3) may be driven in one phase (+Tx) while another group (102-4 to -7) may be driven in the opposite phase (−Tx).

FIG. 2D-0 shows a response to an object position 206-0. As shown, because the object position 206-0 corresponds to electrodes in the Tx+ phase, a sense current may have a positive value I+.

FIG. 2D-1 shows a response to another object position 206-1. As shown, because the object position 206-1 corresponds to electrodes in the Tx-phase, a sense current may have a negative value I−.

FIG. 2D-2 shows a response to a further object position 206-2. As shown, the object position 206-2 occurs at a transition point of different phases. In such a case, sense current may be substantially zero, particularly when there are equal numbers of electrodes in opposite phases. Accordingly, this object position may represent a low sensitivity location. To compensate for such a low sensitivity location, embodiments may alter phases of electrode groups, as shown in FIGS. 2E-0 to 2E-2.

Figures 0, 2E:
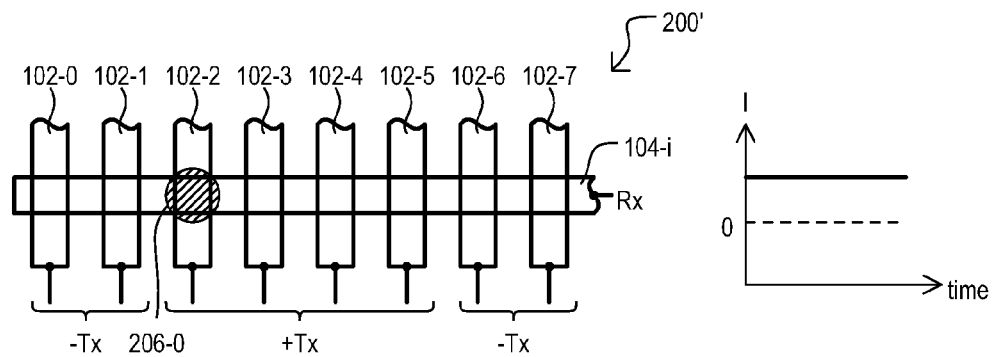
Figures 1, 2E:
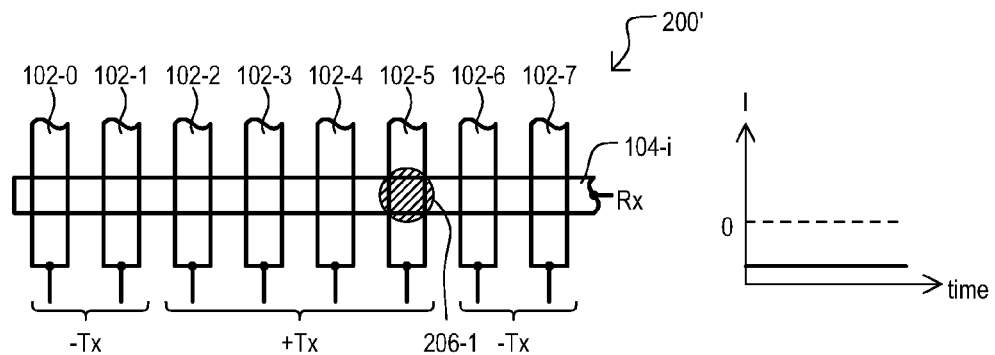
Figures 2, 2E:
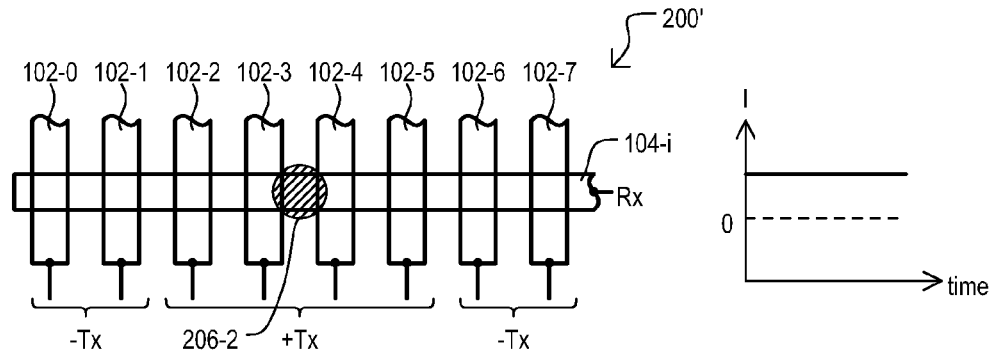

FIGS. 2E-0 to 2E-2 show a second measurement period in which a third collection of electrodes (102-2 to -5) may be driven in one phase (+Tx) while further group (102-0-1, -6-7) may be driven in the opposite phase (−Tx).

FIG. 2E-0 shows a response to an object position 206-0. As shown, because the object position 206-0 corresponds to electrodes in the Tx+ phase, a sense current may have a positive value I+.

FIG. 2E-1 shows a response to object position 206-1. As shown, because the object position 206-1 corresponds to electrodes in the Tx+ phase, a sense current may have a positive value I+.

FIG. 2E-2 shows a change in phase distribution can catch low sensitivity points. Object position 206-2, which occurred at a transition point in the first measurement period, now corresponds to electrodes in the Tx+ phase. Thus, a sense current may have a positive value I+.

The combination of the first measurement period and the second measurement period may represent a total sensing for the Rx electrode 104-i. While a Tx electrode pattern from the first measurement may not sense a touch at phase transition point, as the negative and positive phase Tx's are juxtaposed, a Tx pattern from the second measurement includes such phase transition points in a single phase group.

In very particular embodiments, a number of electrodes having one phase may be equal to the number of electrodes having the opposite phase for both measurement periods. In such an arrangement, a current draw may be the same in both measurement periods.

While embodiments have shown Tx electrodes driven with opposite phase signals, other embodiments may include different phase difference in transmit electrodes. As but one example, transmit phases may be varied according to noise environment to maximize signal-to-noise ratios for a given environment. Further, phases may be varied according to a pseudorandom sequence to increase signal-to-noise ratios in sensing operation. While FIGS. 2A and 2B show selection of single electrode in an Rx mode and all electrodes in a Tx mode, in other embodiments, more than one electrode may be selected in the Rx mode and a greater number of electrodes in a Tx mode. Further, in a sense operation one selection circuit (e.g., first selection circuit 208) may operate in the Rx mode followed by the Tx mode, while the other selection circuit (e.g., second selection circuit 210) may operate in the Tx mode followed by the Rx mode.

In this way, a system may include selection circuits that selectively connect individual electrodes from one group to a capacitance sense circuit while connecting another group of electrodes to a signal generator circuit.

Referring to FIG. 3, a portion of an electrode array that may be included in embodiments is shown in a top plan view, and designated by the general reference character 300. Electrode array 300 may include a first set of electrodes 302 and a second set of electrodes 304 having electrodes that are substantially perpendicular to one another. Each electrode (one shown as 302-i) may include a number of wide sense sections (one shown as 322) connected to one another at narrower cross-over regions (one shown as 324), where an electrode from one group intersects that of another group.

Referring to FIG. 4, a system sensing configuration according to an embodiment is shown in a block schematic diagram. FIG. 4 shows a system 401 that includes sections like that of FIG. 2A, and such like sections are referred to by the same reference character but with the leading digit being "4" instead of "2".

A signal generator circuit 414 may generate one or more periodic signals that are applied to a selection circuit 410/408. In response to selection signals SEL_Tx generated by controller 416, such selection signals may be applied to multiple electrodes (serving as Tx electrodes) within an electrode array. Such multiple Tx electrodes may thus be driven with one or more periodic signals. In one embodiment, selection signals SEL_Tx may select an entire group of electrodes for receiving the periodic signal(s).

In response to selection signals SEL_Rx generated by controller 416, another selection circuit 408/410 may select one or more electrodes for sensing (i.e., to serve as Rx electrodes). The number of Rx electrodes selected for capacitance sensing operation is less than the number of Tx electrodes. In one embodiment, selection signals SEL_Rx may select single electrodes for capacitance sensing.

A resulting capacitance within electrode array 400 from operation of selection circuits (410/408 and 408/410) is represented by capacitance values Cm and Cf. A capacitance Cm may correspond to a mutual capacitance between Tx electrodes and Rx electrode(s). A capacitance Cf corresponds to a change in capacitance arising from the presence of an object (e.g., finger, or stylus) on, or in proximity to, electrode array 400. If an object is not present, Cf may be zero. However, if an object is present, it may lower a mutual capacitance, thus Cf may be a conceptualized as a "negative" capacitance corresponding to such an object induced drop.

By operation of Cm (and Cf, if present), the periodic signal(s) driven on Tx electrodes will induce a periodic sense current (Isense) on the Rx electrode(s). Such a sense current (Isense) may be a received as an input signal at capacitance sense circuit 412.

Within capacitance sense circuit 412, a demodulator circuit 426 may generate a read current value (Iread) from a sense current value (Isense). In very particular embodiments, such an operation may include a half- or full-wave type rectification operation. A read current value (Tread) may be input to a current-to-code converter circuit 428. Current-to-code converter circuit 428 may convert a read current (Tread) into a digital value CODE.

It is understood that FIG. 4 shows a capacitance sensing operation for one electrode, and that such an operation may be repeated for all electrodes. Further, FIG. 4 shows electrodes accessed by selection circuit 410/408 serving as Tx electrodes, and shows electrodes accessed by selection circuit 408/410 serving as Rx electrode(s). In a second portion of a sensing operation, the roles of such electrodes and selection circuits are reversed.

In this way, a mutual capacitance may be sensed between multiple transmit electrodes and a smaller number of receive electrodes by driving transmit electrodes with a periodic signal to induce a current in the receive electrode(s).

Referring now to FIG. 5, a demodulator circuit that may be included in embodiments is shown in a block schematic diagram, and designated by the general reference character 526. In one particular embodiment, a demodulator circuit 526 may be included as item 426 in FIG. 4. A demodulator circuit 526 may include switches 530-0/1, analog buffer 532, a compensation current digital-to-analog-converter (IDAC) 534, and modulator control circuit 536. Switches 530-0/1 may be controlled by modulator control circuit 536. Modulator control circuit 526 may open and close switches 530-0/1 at a frequency corresponding to transmit signal(s) Tx(s), which in this case is determined by timing signal Tx_out. An analog buffer circuit 532 may drive an input node corresponding to a value received in a previous half cycle of Tx_out. A compensation IDAC 534 may provide a variable current that may compensate for variations in a baseline current, and thus enable greater detection of any change current arising from an object (i.e., from Cf).

Referring now to FIG. 6, a current-to-code converter circuit that may be included in embodiments is shown in a block schematic diagram, and designated by the general reference character 628. In one particular embodiment, a current-to-code converter circuit 628 may be included as item 428 in FIG. 4. A current-to-code converter circuit 628 may include a transimpedance amplifier circuit 638 and an analog-to-digital converter (ADC) 640. A transimpedance amplifier circuit 638 may include an operational amplifier (op amp) 642 and a feedback network 644, and may convert a sense current (Isense) into a sense voltage Vsense. ADC 640 may convert sense voltage (Vsense) into a digital value VALUE. An ADC 640 may be any suitable ADC including but not limited to a sigma-delta ADC, an integrating ADC, or a successive-approximation ADC, as but a few examples.

Figure 7:
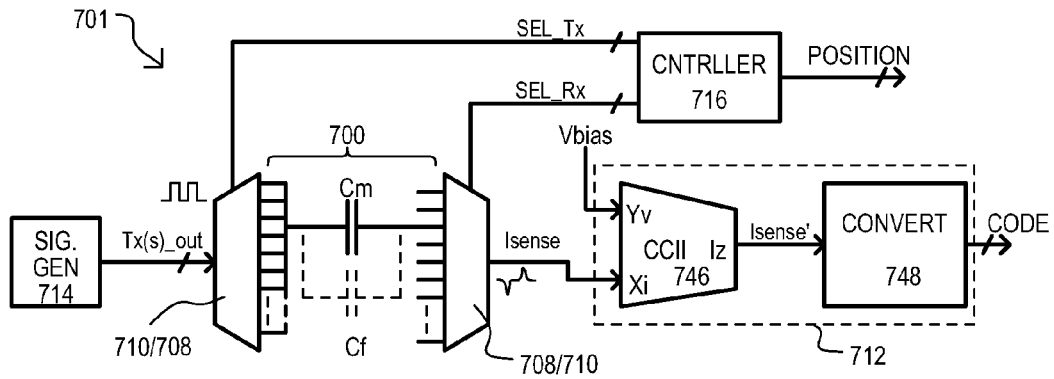
FIG. 7 is a block schematic diagram showing a sensing configuration according to an embodiment that includes a current conveyor circuit.

Referring to FIG. 7, a system sensing configuration according to another embodiment is shown in a block schematic diagram. FIG. 7 shows a system 701 that includes sections like that of FIG. 4, and such like sections are referred to by the same reference character but with the leading digit being "7" instead of "4".

A system 701 may differ from that of FIG. 4 in that a capacitance sense circuit 712 may includes a current conveyor circuit 746 and a converter circuit 748. A current conveyor circuit 746 may receive a current at a relatively low impedance current input Xi, and provide a corresponding current at a higher impedance output Iz. In the very particular embodiment, a current conveyor circuit 746 may be a current conveyor type II (CCII) circuit.

A converter 748 may convert a current output from current conveyor circuit 746 (Isense') into a code value. Such an operation may include suitable conversion techniques, including but not limited to rectification and/or ADC operations as described herein and equivalents.

In this way, a mutual capacitance may be sensed between multiple transmit electrodes and a smaller number of receive electrodes with a current conveyor type circuit.

While embodiments have shown capacitance sensing systems and circuits that drive transmit electrodes at a fixed frequency to sense a mutual capacitance, alternate embodiments may include relaxation oscillator techniques to detect such a capacitance. In a relaxation oscillator technique, an oscillator output frequency may vary according to a mutual capacitance (Cm and any Cf component) between many Tx electrodes and a smaller number (as small as one) of Rx electrodes.

Figure 8:
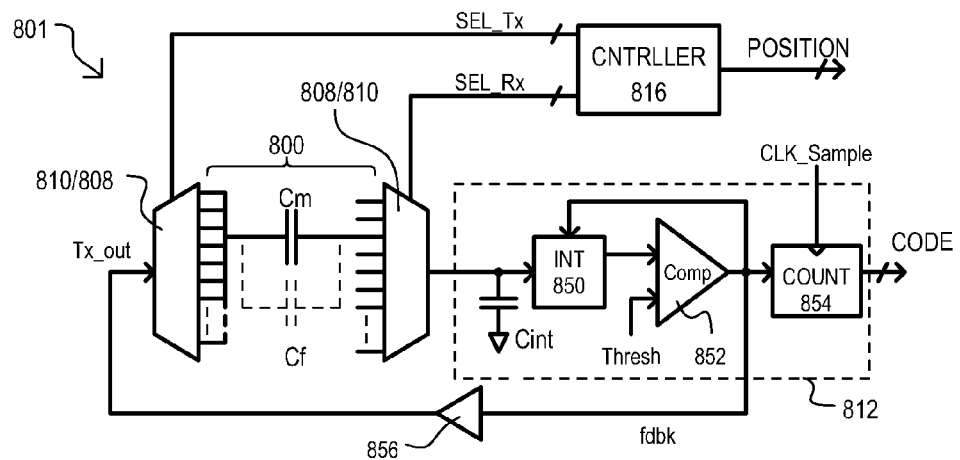
FIG. 8 is a block schematic diagram showing a relaxation oscillator sensing configuration according to an embodiment.

A very particular relaxation oscillator embodiment is shown in a block schematic diagram in FIG. 8 and designated by the general reference character 801.

Referring to FIG. 8, a system sensing configuration according to another embodiment is shown in a block schematic diagram. FIG. 8 shows a system 801 that includes sections like that of FIG. 4, and such like sections are referred to by the same reference character but with the leading digit being "8" instead of "4".

A system 801 may differ from that of FIG. 4 in that it may include a capacitance sense circuit 812 having a relaxation oscillator configuration that provides a feedback signal as a transmit signal Tx_out for transmit electrodes, rather than a signal generator circuit. Accordingly, Tx electrodes (i.e., those connected by selection circuit 810/808) may be driven at a frequency that varies according Cm (and Cf, if present due to an object).

In the embodiment shown, a capacitance sense circuit 812 may include an integrating capacitance Cint, an integrator circuit 850, a comparator circuit 852, and a counter circuit 854. An integrator circuit 850 may integrate a charge at a terminal of capacitance Cint (which may vary in response to CM and Cf), and provide such a value as an input to comparator circuit 852. Comparator circuit 852 may compare an output from integrator circuit 850 to a threshold to generate feedback signal (fdbk). A feedback signal (fdbk) can reset integrator circuit 850 (e.g., discharge Cint) and serve as a signal applied to Tx electrodes. A feedback signal (fdbk) may be buffered by a buffer 854. An output of comparator circuit 852 may be received by counter circuit 854. Counter circuit 854 can count the number of transitions within a set time period to generate a code output value CODE which may be proportional to oscillating frequency, which frequency may vary as Cm+Cp varies.

Changes in capacitance may be detected according to an output frequency, integration of a duty cycle, or any other suitable technique.

In this way, a mutual capacitance may be sensed between multiple transmit electrodes and a smaller number of receive electrodes with a relaxation oscillator type circuit.

Figure 9:
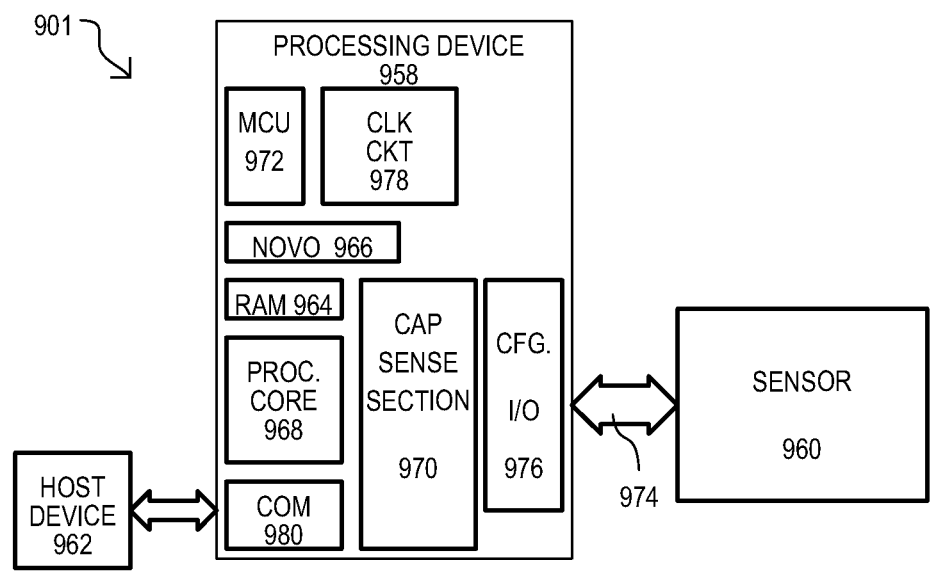
FIG. 9 is a block diagram of an electronic system for implementing capacitance sensing according to an embodiment.

FIG. 9 illustrates a block diagram of one embodiment of an electronic system in which capacitance sensing as described herein, and equivalents, may be implemented. Electronic system 901 may include a processing device 958, sensor array 960, and host device 962. The processing device 958 may include programmable input/output ports, and a digital block array, which may be configured to implement a variety of digital logic circuits (e.g., DACs, digital filters, or digital control systems) using, in one embodiment, configurable user modules ("UMs"). Processing device 958 may also include memory, such as random access memory (RAM) 964 and nonvolatile memory 966. RAM 964 may be static RAM (SRAM), and nonvolatile memory 966 may be used to store firmware (e.g., control algorithms executable by processing core 968 to implement operations as described herein). For example, processing core 968 may configure signal paths to electrodes to enable driving such electrodes with a signal (Tx electrodes), or connecting electrodes to a capacitance sense section 970 (Rx electrodes). Processing device 958 may also include a memory controller unit (MCU) 972 coupled to memory and the processing core 968.

Processing device 958 may also include an analog block array that may also be configured to implement a variety of analog circuits (e.g., ADCs or analog filters) using, in one embodiment, configurable UMs.

In the embodiment shown, capacitance sensing section 970 may be integrated into processing device 958. Capacitance sensing section 970 may be connected to configurable I/Os 976 for coupling to an external component, such as sensor array 960 and/or other devices. Capacitance sensing section 970 may include capacitance sensing circuits as described herein, and equivalents.

In the particular embodiment of FIG. 9, the electronic system 901 includes a sensor array 960 coupled to the processing device 958 via bus 974. Sensor array 960 may include a multi-dimension sensor array. A multi-dimension sensor array includes multiple sensor elements, organized as rows and columns, as one example. In another embodiment, sensor array 960 may include a single-dimension sensor array. A single-dimension sensor array includes multiple sensor elements, organized as rows, or alternatively, as columns.

Processing device 958 may further include a clock circuit 978 and communication block 980. The clock circuit 978 may provide clock signals to one or more of the components of processing device 958, such as periodic Tx_out signals, as described for embodiments herein. Communication block 980 may communicate with an external component, such as a host device 962.

In some embodiments, a processing device 958 may reside on a common carrier substrate such as, for example, an integrated circuit (IC) die substrate, a multi-chip module substrate, or the like. Alternatively, the components of processing device 958 may be one or more separate integrated circuits and/or discrete components. In one exemplary embodiment, processing device 958 may be a TrueTouch™ processing device, manufactured by Cypress Semiconductor Corporation, of San Jose, Calif., U.S.A. Alternatively, processing device 958 may be one or more other processing devices known by those of ordinary skill in the art, such as a microprocessor or central processing unit, a controller, special-purpose processor, digital signal processor (DSP), an application specific integrated circuit (ASIC), a field programmable gate array (FPGA), or the like.

A capacitance sensing section 970 may be integrated into an IC of the processing device 958, or alternatively, may reside in a separate IC. Alternatively, descriptions of capacitance sensing section 970 may be generated and compiled for incorporation into other integrated circuits. For example, behavioral level code describing capacitance sensing section 970, or portions thereof, may be generated using a hardware descriptive language, such as VHDL or Verilog®, and stored to a machine-accessible medium (e.g., CD-ROM, hard disk, floppy disk, etc.). Furthermore, the behavioral level code can be compiled into register transfer level ("RTL") code, a netlist, or even a circuit layout and stored to a machine-accessible medium. The behavioral level code, the RTL code, the netlist, and the circuit layout all represent various levels of abstraction to describe capacitance sensing section 970.

It should be noted that the components of electronic system 901 may include all the components described above. Alternatively, electronic system 901 may include only some of the components described above.

Having described, devices, systems, and methods performed by such devices/systems, various additional methods according to embodiments will now be described in a series of flow diagrams.

Figure 10:
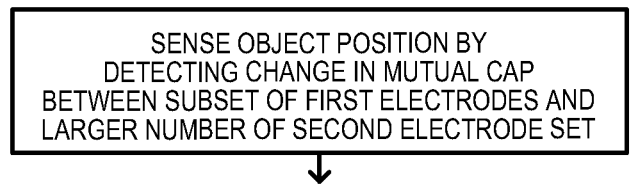
FIG. 10 is a flow diagram of a sensing method according to an embodiment.

Referring to FIG. 10, a method according to one embodiment is shown in a flow diagram and designated by the general reference character 1082. A method 1082 may include sensing an object position by detecting a change in mutual capacitance between a subset of a first electrode set and a larger second electrode set. In some embodiments, the subset of the first electrode set may be a single electrode.

While embodiments may include methods for sensing a mutual capacitance, other embodiments may include methods for calibrating a system for mutual sensing as described herein. One method according to such an embodiment is shown in FIG. 11.

Figure 11:
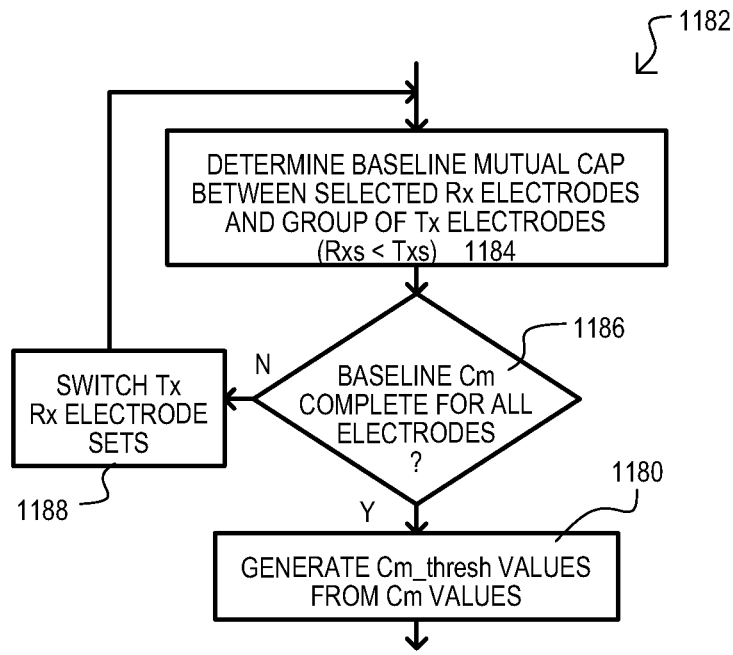
FIG. 11 is a flow diagram of a calibration method according to an embodiment.

Referring to FIG. 11, a method 1182 may include determining a baseline mutual capacitance between selected Rx electrodes and a group of Tx electrodes, where the number of Rx electrodes is less than the number of Tx electrodes (Rxs<Txs) (1184). Such an action may include determining such a mutual capacitance in the absence of an object. If baseline mutual capacitance values have not been acquired for all electrodes (N from 1186), a method may switch Tx and Rx electrode sets (1185). It is understood that a method 1182 may acquire multiple baseline mutual capacitance values for electrodes.

Referring still to FIG. 11, a method 1182 if baseline mutual capacitance values have been acquired for all electrodes (N from 1186), a method may generate threshold mutual values (Cm_thresh) from the acquired values. In some embodiments, such an action may include generating a value for comparison against sensed Cm valued to determine if an object is present at an electrode.

Figure 12:
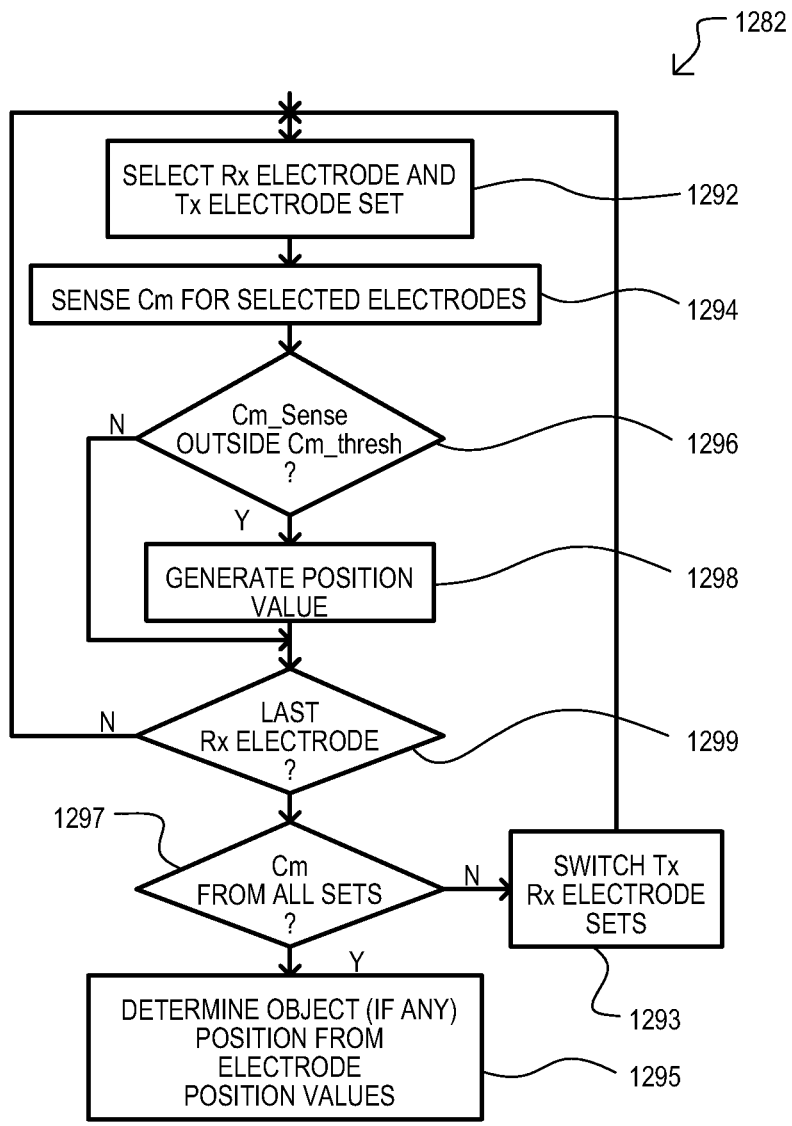
FIG. 12 is a flow diagram of a position sensing method according to an embodiment.

Referring now to FIG. 12, a method according to another embodiment is shown in a flow diagram and designated by the general reference character 1282. A method 1282 may include selecting an Rx electrode and Tx electrode set (1292). Such an action may include connecting selected Rx electrodes to a capacitance sensing circuit, while connecting the Tx electrode set to receive electrical signals. A method 1282 may then sense a mutual capacitance (Cm) for the selected electrodes (1294). Such an action may include sensing a mutual capacitance between a selected Rx electrode and the Tx electrode set.

If a sensed Cm is outside of a threshold value (Cm_thresh) (Y from 1296), a position value may be generated (1298). In very particular embodiments, such an action may include generating a position value based on the Rx electrode being sensed. Regardless of whether a sensed Cm is outside of a threshold value (Cm_thresh), such sensing operations may cycle through Rx electrodes until a Cm is measured for a last Rx electrode (1299). If mutual capacitance values have not been read for all electode sets (N from 1297), a method 1282 may switch Rx and Tx electrode sets, and Cm values may be acquired for the newly defined Rx set.

Once Cm values have been acquired for all electrode sets (Y from 1297), an object position (if any such detectable object is present), may be determined from electrode position values (1295).

Figure 13:
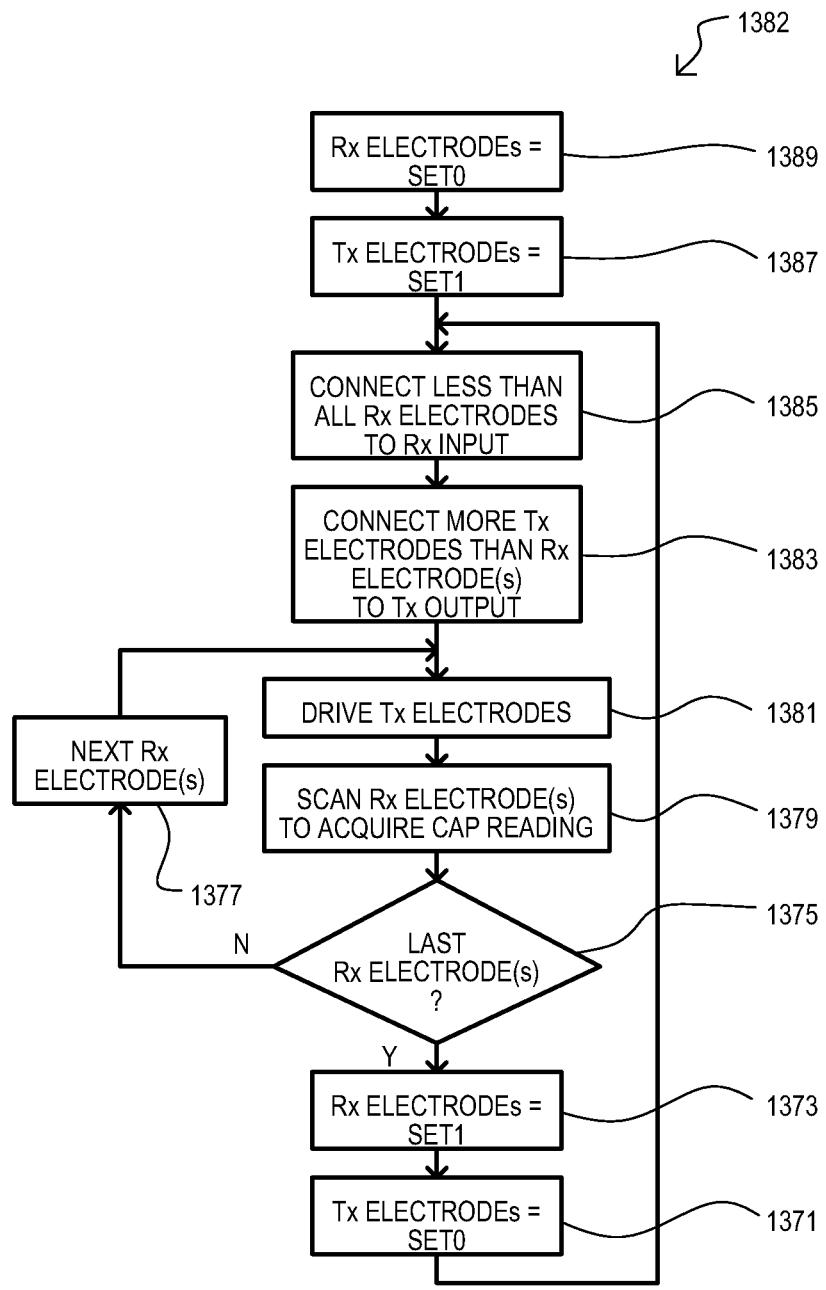
FIG. 13 is a flow diagram of an electrode selection method according to an embodiment.
Figure 14:
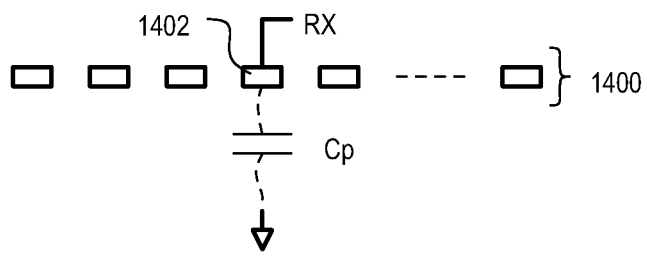
FIG. 14 is a diagram showing conventional self-capacitance sensing.
Figure 15:
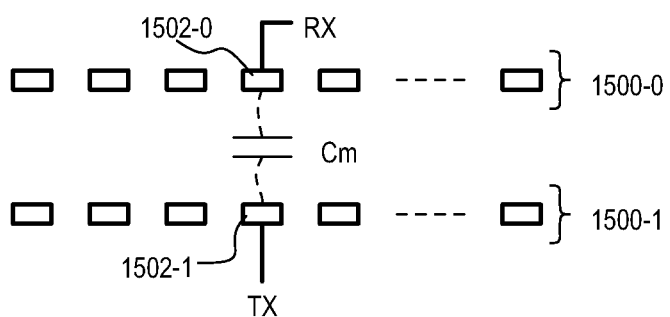
FIG. 15 is a diagram showing conventional mutual capacitance sensing.

Referring now to FIG. 13, a further method according to an embodiment is shown in flow diagram and designated by the general reference character 1382. A method 1382 may include assigning a one set of electrodes to be receive electrodes (Rx ELECTRODES=SET0) (1389) and another set of electrodes to be transmit electrodes (Tx ELECTRODES=SET1) (1387).

A method 1382 may then connect less than all Rx electrodes to an Rx input (1385). In some embodiments, such an action may include connecting single Rx electrodes to an Rx input. More Tx electrodes than Rx electrodes may then be connected to a Tx output (1383). In some embodiments, such an action may include connecting all Tx electrodes of a set to a Tx output.

Tx electrodes may be driven (1381). Such an action may include driving Tx electrodes with an electrical signal that will induce a response on connected Rx electrodes, where such a response corresponds to a mutual capacitance between such electrodes. In one embodiment, such an action may include driving Tx electrodes with one or more periodic signals. Rx electrodes may then be scanned to acquire capacitance readings for selected Rx electrode(s) (1379). Such sensing may continue for all Rx electrodes until a last Rx electrode has been scanned (In some embodiments, such an action may include connecting single Rx electrodes to an Rx input (N from 1375, 1377)).

Once a last Rx electrode has been scanned (Y from 1375), electrode sets may be switched (Rx ELECTRODES=SET1) (1373) and (Tx ELECTRODES=SET0) (1371). A method 1382 may then repeat connecting and scanning actions noted above.

Embodiments of the invention may provide greater signal to noise ratio than mutual sensing capacitance approaches that utilize self-capacitance of a single electrode (e.g., single electrodes capacitance with respect ground). In some embodiments, the above described mutual capacitance sensing systems, devices and methods may be utilized in single touch sensing applications, with resulting sensing resolutions being higher than those achieved in self-capacitance sensing approaches.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claims require more features than are expressly recited in each claim. Rather, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A capacitance sensing system, comprising:
a first selection circuit that couples N electrodes of a first electrode set to a capacitance sense circuit, wherein the first selection circuit couples the N electrodes to the capacitance sense circuit in a first sense portion of a sensing operation, and further couples L electrodes of the first electrode set to a signal generator circuit in a second sense portion of the sensing operation; and
a second selection circuit that couples M electrodes of a second electrode set, substantially simultaneously, to the signal generator circuit as a group to induce current in the N electrodes by mutual capacitance between the M and N electrodes; wherein N is at least one, and M>N, wherein the second selection circuit couples the M electrodes of the second electrode to the signal generator circuit in the first sense portion, and further couples K electrodes of the second electrode set to the capacitance sense circuit in the second sense portion, and wherein K is at least one, and L>K.

2. The capacitance sensing system of claim 1, wherein:
N is one and M is all electrodes of the second set.

3. The capacitance sensing system of claim 1, wherein:
the first selection circuit sequentially couples different groups of N electrodes of the first electrode set to the capacitance sense circuit while the second selection circuit couples the M electrodes to the signal generator circuit.

4. The capacitance sensing system of claim 1, wherein:
K is one and L is all electrodes of the first set.

5. The capacitance sensing system of claim 1, wherein:
the first set of electrodes are disposed substantially parallel to one another in a first direction; and
the second set of electrodes is disposed substantially parallel to one another in a second direction different from the first direction.

6. The capacitance sensing system of claim 1, wherein:
the sense circuit includes a current sense circuit that generates a read current that varies according to a sensed capacitance, and an ADC that converts the read current into a digital value.

7. A method, comprising:
in a first sense portion of a sensing operation,
coupling a subset of N electrodes of a first electrode set to a capacitance sense circuit, and
coupling a subset of M electrodes of a second electrode set, substantially simultaneously, to a signal generator circuit as a group to induce current in the N electrodes by mutual capacitance between the M and N electrodes;
in a second sense portion of the sensing operation,
coupling L electrodes of the first electrode set to the signal generator circuit, and
coupling K electrodes of the second electrode set to the capacitance sense circuit in the second sense portion, and wherein K is at least one, and L >K, wherein N is at least one, and M >N; and
generating first object position data by detecting change in mutual capacitance between the N electrodes and the M electrodes by sensing electrical changes induced in the N electrodes in response to electrical signals driven on the M electrodes substantially simultaneously.

8. The method of claim 7, further including:
generating second object position data by detecting change in mutual capacitance between subsets of second electrodes and a larger group of first electrodes.

9. The method of claim 7, wherein:
generating first object position data includes sequentially measuring mutual capacitance between each first electrode and all second electrodes.

10. The method of claim 7, wherein driving at least one first set of the second electrodes with a first time varying signal while driving a second group of the second electrodes with a second time varying signal that is different than the first periodic signal.

11. The method of claim 10, wherein:
detecting change in mutual capacitance further includes converting induced current into a digital value.

12. The method of claim 7, further including:
generating calibration values for multiple subsets of first electrodes by measuring a mutual capacitance between each of the multiple subsets of first electrodes and larger group of second electrodes while an object is not within a predetermined proximity of the electrodes.

* * * * *